US009255189B2

(12) United States Patent
Dottori et al.

(10) Patent No.: US 9,255,189 B2
(45) Date of Patent: Feb. 9, 2016

(54) ETHANOL PRODUCTION WITH TWO STAGE CONTINUOUS STEAM PRE-TREATMENT OF LIGNOCELLULOSIC BIOMASS

(75) Inventors: Frank A. Dottori, Temiscaming (CA); Robert Ashley Cooper Benson, North Bay (CA); Regis-Olivier Benech, Chatham (CA)

(73) Assignee: GreenField Specialty Alcohols Inc., Toronto (CA)

( * ) Notice: Subject to any disclaimer, the term of this patent is extended or adjusted under 35 U.S.C. 154(b) by 0 days.

(21) Appl. No.: 13/554,601

(22) Filed: Jul. 20, 2012

(65) Prior Publication Data

US 2013/0029406 A1 Jan. 31, 2013

Related U.S. Application Data

(60) Provisional application No. 61/512,723, filed on Jul. 28, 2011.

(51) Int. Cl.
*C12S 3/02* (2006.01)
*C08B 37/00* (2006.01)
*C08H 8/00* (2010.01)

(52) U.S. Cl.
CPC .............. *C08H 8/00* (2013.01); *C08B 37/0057* (2013.01); *Y02E 50/16* (2013.01); *Y02E 50/343* (2013.01)

(58) Field of Classification Search
None
See application file for complete search history.

(56) References Cited

U.S. PATENT DOCUMENTS

| | | | | |
|---|---|---|---|---|
| 3,585,104 A * | 6/1971 | Kleinert | ........................... | 162/17 |
| 4,409,032 A | 10/1983 | Paszner et al. | | |
| 4,470,851 A | 9/1984 | Paszner et al. | | |
| 4,764,596 A | 8/1988 | Lora et al. | | |
| 2002/0069987 A1 | 6/2002 | Pye | | |
| 2007/0034345 A1 | 2/2007 | Petrus et al. | | |
| 2008/0057555 A1 * | 3/2008 | Nguyen | ........................ | 435/165 |
| 2009/0093027 A1 | 4/2009 | Balan et al. | | |
| 2010/0065128 A1 | 3/2010 | Benson et al. | | |

FOREIGN PATENT DOCUMENTS

| | | |
|---|---|---|
| CA | 2 746 783 | 6/2010 |
| CA | 2 701 194 | 10/2010 |
| WO | 93/15261 | 8/1993 |
| WO | 97/36040 | 10/1997 |
| WO | 2008137639 | 11/2008 |
| WO | 2008155639 | 12/2008 |
| WO | WO 2010071805 A2 * | 6/2010 |
| WO | 2010121367 | 10/2010 |
| WO | 2011002660 | 1/2011 |
| WO | 2011/043935 | 4/2011 |

OTHER PUBLICATIONS

Azzam, "Pretreatment of cane bagasse with alkaline hydrogen peroxide for enzymatic hydrolysis of cellulose and ethanol fermentation", Journal Environ. Sci. Health, 1989, vol. 24, pp. 421-433.
Katzen et al., Use of cellulosic feedstocks for alcohol production, The Alcohols Textbook, Chapter 5, Nothingham University Press, 1995. pp. 37-46.
Araque et al., "Evaluation of organosolv pretreatment for the conversion of Pinus radiata D. Don to ethanol", Enzyme and Microbial Technology, vol. 43, Aug. 5, 2008, pp. 214-219.
Pan et al., "Bioconversion of hybrid poplar to ethanol and co-products using an organosolv fractionation process: optimization of process yields", Biotechnol. Bioeng, Aug. 5, 2006, published online Mar. 7, 2006, vol. 94, No. 5, pp. 851-861.
Arato et al., "The Lignol Approach to Biorefining of Woody Biomass to Produce Ethanol and Chemicals", Applied Biochemistry and Biotechnology, vol. 121-124, Mar. 2005, pp. 871-882.
Muurinen, "Organosolv pulping—A review and distillation study related to peroxyacid pulping", University of Oulu, Finland, http://herkules.oulu.fi/isbn9514256611/isbn9514256611.pdf, ISBN 951-42-5661-1, presented Jun. 30, 2000, 314 pages.
Yang et al., "Pretreatment: the key to unlocking low-cost cellulosic ethanol", Biofuels, Bioproducts and Biorefinering, Jan. 2008, published online Dec. 17, 2007, vol. 2, pp. 26-40.
International Application No. PCT/CA2012/050496—International Search Report dated Sep. 7, 2012.
Itoh et al., "Bioorganosolve pretreatments for simultaneous saccharification and fermentation of beech wood by ethanolysis and white rot fungi", Journal of Biotechnology, vol. 103, Aug. 15, 2003, pp. 273-280.
Chow et al., "Energy resources and global development", Science, vol. 302, Nov. 28, 2003, pp. 1528-1531.
Chum et al., "Biomass and Renewable Fuels", Fuel Processing Technology, Jun. 2001, vol. 71, Elsevier Science B.V., United States of America, pp. 187-195.
Wyman, "Biotechnology Foundation for Bioethanol Production" Handbook on Bioethanol: Production and Utilization, Jul. 1996, Taylor and Francis, United States of America, pp. 10-12.
Shapouri et al., "Estimating the net energy balance of corn ethanol; An Economic Research Service Report", USDA Report 721, Jul. 1995, 13 pages.

(Continued)

*Primary Examiner* — Louise W Humphrey
*Assistant Examiner* — Christopher Keller
(74) *Attorney, Agent, or Firm* — Borden Ladner Gervais LLP

(57) ABSTRACT

Disclosed is a method of producing ethanol from lignocellulosic biomass, including a two stage steam pretreatment process. The first stage of the steam pretreatment is carried out by heating the biomass with high pressure steam to a first stage temperature of 140° C. to 180° C. for a first stage time of 30 minutes to 2 hours at a first stage pressure of 105 to 150 psig; and the second steam pretreatment stage is carried out by heating the biomass with high pressure steam to raise the biomass temperature to a second stage temperature of 190° C. to 210° C. for a second stage time of 2 to 10 minutes at a second stage pressure of 167 to 262 psig. Hemicellulose and inhibitors (inhibitory compounds) to downstream hydrolysis and fermentation are preferably removed between the first and second pretreating stages, more preferably after each pretreatment stage.

14 Claims, 1 Drawing Sheet

(56) References Cited

OTHER PUBLICATIONS

Shapouri et al., "The Energy Balance of corn ethanol: an update", USDA Report 814, Jul. 2002, 19 pages.
Wald et al., "The Energy challenge: A Renewed push for ethanol, without the corn", New York Times, Apr. 17, 2007, 5 pages.
Greer, "Commercializing cellulosic ethanol", Biocycle, vol. 49, Nov. 2008, No. 11, 4 pages.
Hill et al. "Environmental, economic, and energetic costs and benefits of biodiesel and ethanol biofuels", Proc. Natl. Acad. Sci. USA, Jul. 25, 2006, vol. 103, No. 30, pp. 11206-11210.
Farrell et al., "Ethanol can contribute to energy and environmental goals", Science, Jan. 27, 2006, vol. 311, 23 pages.
Somerville, "Biofuels", Current biology, 2007, vol. 17, No. 4, pp. 115-119.
Schuetzle et al., "Alcohol fuels from biomass-Assessment of production technologies", Western Governors' Association National Biomass and Regional Partnership Report, Jul. 2007, pp. 1-119, (125 pages).
Neely, "Factors affecting the pretreatment of biomass with gaseous ozone", Biotechnology and Bioengineering, vol. XXVI, Jan. 1984, pp. 59-65.
Vidal et al., "Improvement of in vitro digestibility of poplar sawdust", Biomass, 1988, accepted for publication Jan. 1988, vol. 16, pp. 1-17.
Delmer et al., "Cellulose biosynthesis", American Society of Plant Physiologist, The Plant Cell, vol. 7, Jul. 1995, pp. 987-1000.
Morohoshi, "Chemical characterization of wood and its components", In Wood and cellulosic chemistry; Hon, D.N.S, Shiraishi, N., Eds.; Marcel Dekker, Inc.: New York, USA, 1991, pp. 331-392.
de Vrije et al, "Pretreatment of Miscanthus for Hydrogen Production by Thermotoga Elfii", International Journal of Hydrogen Energy, Nov.-Dec. 2002, vol. 27, pp. 1381-1390.
Ha et al., "Fine Structure in cellulose microfibrils: NMR evidence from onion and quince", The Plant Journal, Aug. 27, 1998, published 1998, vol. 16, No. 2, pp. 183-190.
Palmqvist et al., "Fermentation of lignocellulosic hydrolysates. II: Inhibitors and mechanisms of inhibition", Bioresource Technology, Aug. 2000, vol. 74, pp. 25-33.
Galbe et al., "A review of the production of ethanol from softwood", Appl Microbiol Biotechnol, vol. 59, published online Jul. 17, 2002, pp. 618-628.
Torget et al., "Dilute sulfuric acid pretreatment of hardwood bark", Bioresource Technology, vol. 35, 1991, pp. 239-246.
Donghai et al., "Effects of different pretreatment modes on the enzymatic digestibility of corn leaf and corn stalk", Chinese Journal of Eng., vol. 14, No. 6, 2006, accepted for publication Dec. 2006, pp. 796-801.
Sun et al., "Hydrolysis of lignocellulosic materials for ethanol production: A review", Bioresource Technology, vol. 83, 2002, accepted for publication Oct. 2001, pp. 1-11.
McMillan et al., "Pretreatment of lignocellulosic biomass", Biprocessing Branch, Alternative Fuels Division, National Renewable Energy Laboratory, 1994, Received for publication Mar. 1994 American Chemical Society, pp. 292-324.
Fan et al., "The nature of lignocellulosics and their pretreatments for enzymatic hydrolysis", Advances in Biochemical Engineering, 1982 vol. 23, pp. 158-187.
Mosier et al., "Features of promising technologies for pretreatment of lignocellulosic biomass", Bioresource Technology, vol. 96, available online Sep. 29, 2004, pp. 673-686.
Henley et al., "Enzymatic saccharification of cellulose in membrane reactors", Enzyme Microb. Tech., vol. 2, Jul. 1980, pp. 206-208.
Berlin et al., "Inhibition of cellulase, xylanase and beta-glucosidase activities by softwood lignin preparations", Journal of Biotechnology, vol. 125, Sep. 1, 2006, pp. 198-209.
Chandra et al. "Substrate pretreatment: The key to effective enzymatic hydrolysis of lignocellulosics?", Adv. Biochem Engin/Biotechnol., published online May 26, 2007, vol. 108, pp. 67-93.
Kassim, "Enzymatic and chemical hydrolysis of certain cellulosic materials", Agricultural Wastes, vol. 17, 1986, pp. 229-233.
Xu et al., "Enzymatic hydrolysis of pretreated soybean straw", Biomass and Bioenergy, vol. 31, Feb. 2006, pp. 162-167.
Vaccarino et al., "Effect of SO2NaOH and Na2CO3 pretreatments on the degradability and cellulase digestibility of grape Marc", Biological Wastes, vol. 20, 1987, pp. 79-88.
Silverstein et al., "A comparison of chemical pretreatment methods for improving saccharification of cotton stalks", Bioresource Technology, available online Dec. 8, 2006, No. 98, pp. 3000-3011.
Zhao et al., "Comparative study on chemical pretreatment methods for improving enzymatic digestibility of crofton weed stem", Bioresource Technology, available online Aug. 20, 2007, vol. 99, pp. 3729-3736.
Gaspar et al., "Corn fiber as a raw material for hemicellulose and ethanol production", Process Biochemistry, 2007, accepted for publication Apr. 2007, vol. 42, pp. 1135-1139.
Saha et al., "Ethanol production from alkaline peroxide pretreated enzymatically saccharified wheat straw", Biotechnol. Prog., published online Jan. 19, 2006, vol. 22, pp. 449-453.
Saha et al., "Enzymatic saccharification and fermentation of alkaline peroxide pretreated rice hulls to ethanol", Enzyme and Microbial Technology, vol. 41, 2007, accepted for publication Apr. 2007 pp. 528-532.
Mishima et al., "Comparative study on chemical pretreatments to accelerate enzymatic hydrolysis of aquatic macrophyte biomass used in water purification processes.", Bioresource Technology, available online Nov. 23, 2005, vol. 97, pp. 2166-2172.
Sun et al., "Characteristics of degraded cellulose obtained from steam-exploded wheat straw", Carbohydrate Research, available online Dec. 2, 2004, vol. 340, pp. 97-106.
Chum et al., "Evaluation of pretreatments of biomass for enzymatic hydrolysis of cellulose", Solar Energy Research Institute: Golden, Colorado, Oct. 1985, pp. 1-67.
Taherzadeh et al., "Acid-based hydrolysis processes for ethanol from lignocellulosic materials: A review", Bioresources, 2007, vol. 2, No. 3, pp. 472-499.
Ruiz et al., "Evaluation of steam explosion pre-treatment for enzymatic hydrolysis of sunflower stalks", Enzyme and Microbial Technology, vol. 42, Jan. 2008, pp. 160-166.
Ballesteros et al., "Ethanol from lignocellulosic materials by a simultaneous saccharification and fermentation process (SFS) with Kluyveromyces marxianus CECT 10875", Process Biochemistry, vol. 39, Oct. 2004, pp. 1843-1848.
Negro et al., "Hydrothermal pretreatment conditions to enhance ethanol production from poplar biomass", Applied Biochemistry and Biotechnology, vol. 105-108, Mar. 2003, pp. 87-100.
Kurabi et al., "Enzymatic hydrolysis of steam exploded and ethanol organosolv-pretreated Douglas-fir by novel and commercial fungal cellulases", Applied Biochemistry and Biotechnology, vol. 121-124, Mar. 2005, pp. 219-230.
Varga et al., "Optimization of steam pretreatment for corn stover to enhance enzymatic digestibility", Applied Biochemistry and Biotechnology, 2004, 17 pages.
Eklund et al., "The influence of SO2 and H2SO4 impregnation of willow prior to steam pretreatment", Bioresource Engineering, vol. 52, 1995, accepted for publication for Feb. 1995, pp. 225-229.
Yang et al., "Effect of xylan and lignin removal by batch and flowthrough pretreatment on the enzymatic digestibility of corn stover cellulose", Biotechnol. Bioeng, Apr. 5, 2004, published online Feb. 13, 2004, vol. 86, pp. 88-95.
Alizadeh et al., "Pretreatment of switchgrass by ammonia fiber explosion (AFEX)", Applied Biochemistry and Biotechnology, vol. 121-124, Mar. 2005, pp. 1133-1141.
Chundawat et al., "Effect of particle size based separation of milled corn stover on AFEX pretreatment and enzymatic digestibility", Biotechnology and Bioengineering, vol. 96, No. 2, Feb. 1, 2007, pp. 219-231.
Eggeman et al., "Process and economic analysis of pretreatment technologies", Bioresource Technology, vol. 96, available online Mar. 10, 2005, pp. 2019-2025.
Taherzadeh et al., "Enzyme-based hydrolysis processes for ethanol from lignocellulosic materials: A review", BioResources, 2007, vol. 2, No. 4, pp. 707-738.
European Patent Application No. 12818297.9, Extended European Search Report dated Jun. 8, 2015.

* cited by examiner

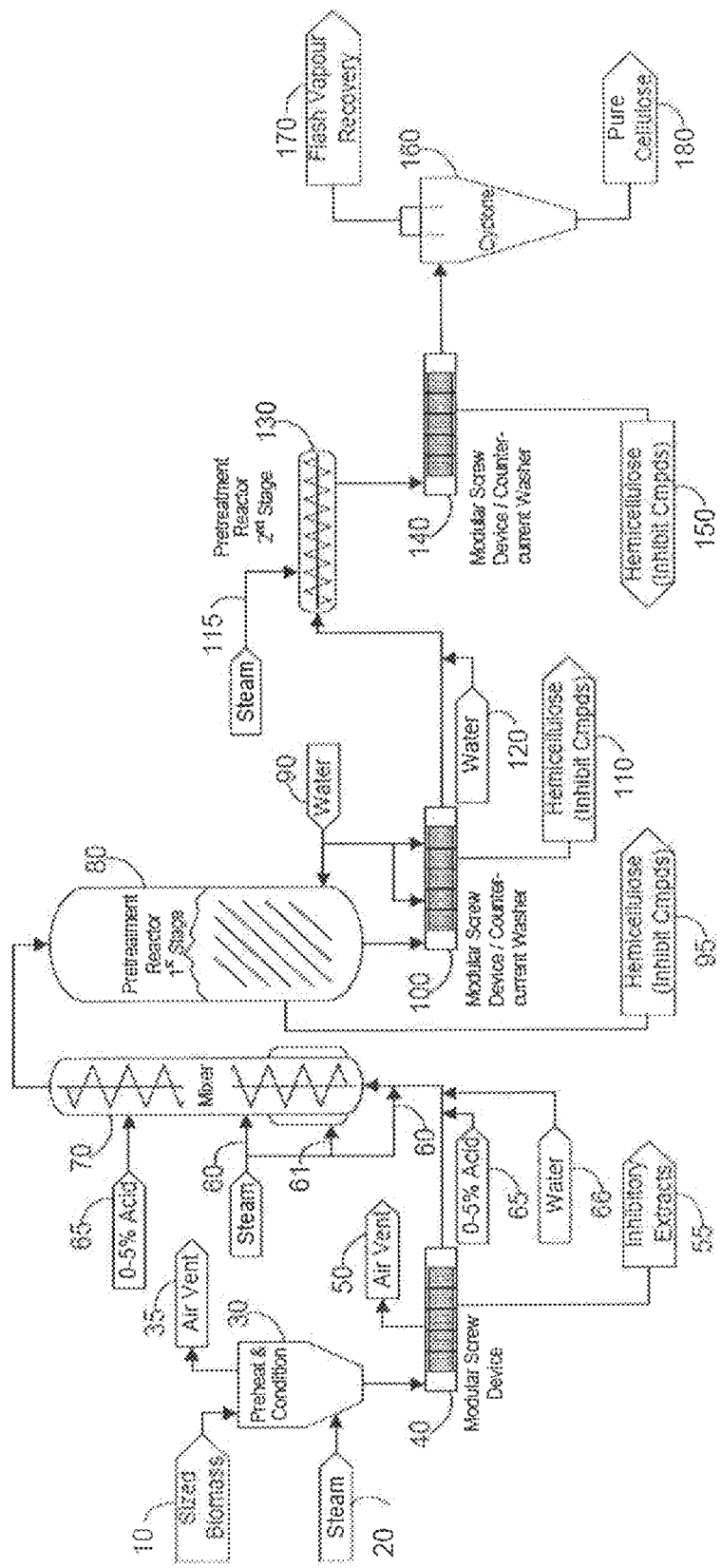

ETHANOL PRODUCTION WITH TWO STAGE CONTINUOUS STEAM PRE-TREATMENT OF LIGNOCELLULOSIC BIOMASS

CROSS REFERENCE TO RELATED APPLICATIONS

This application claims the benefit of priority of U.S. Provisional Patent Application No. 61/512,723, filed Jul. 28, 2011, which is incorporated herein by reference in its entirety.

FIELD OF THE INVENTION

The invention relates to the preparation of lignocellulosic biomass for conversion of the cellulose and hemicellulose fractions to ethanol or other chemicals. In particular, this invention relates to a two stage continuous process for the pretreatment of lignocellulosic biomass.

BACKGROUND AND DESCRIPTION OF PRIOR ART

There is a growing demand for transportation fuels made from renewable feedstocks. These renewable fuels displace fossil fuels resulting in a reduction of greenhouse gas emissions, along with other benefits (1-3).

In North America fuel ethanol is the major transportation fuel. The feedstock for fuel ethanol in North America is primarily corn. Corn contains starch which is hydrolyses to glucose and then fermented to ethanol. In other countries, such as Brazil, fuel ethanol is made by fermenting the sugar in sugar cane. It is advantageous to have an additional source of sugars like glucose to make additional biofuels (4-10).

At the other end of the spectrum of difficulty is cellulose. Cellulose is one of the most abundant organic materials on earth. It is present in many forms of biomass, including agricultural residues like corn Stover and corncobs, woody residues and other plant materials. Cellulose is a polymer of glucose, as is starch.

Lignocellulosic biomass is composed of three primary polymers that make up plant cell walls: Cellulose, hemicellulose, and lignin. Cellulose fibers are locked into a rigid structure of hemicellulose and lignin. Lignin and hemicelluloses form chemically linked complexes that bind water soluble hemicelluloses into a three dimensional array, cemented together by lignin. Lignin covers the cellulose microfibrils and protects them from enzymatic and chemical degradation. These polymers provide plant cell walls with strength and resistance to degradation, which makes lignocellulosic biomass a challenge to use as substrate for biofuel production (11).

This invention is specifically targeting the maximizing of the overall value of components derived from lignocellulosic biomass. Purified cellulose is valuable for many purposes, purified cellulose can be used to make viscous fibre for textiles, cellophane and many other cellulose based chemical products such as CMC, HEC, MCC etc. Specifically, when purified, it may also be more easily hydrolyzed to glucose, which in turn may be more easily fermented to ethanol than in previous processes. Hemicellulose has value as a feedstock for the production of ethanol and also as a precursor to the production of other materials such as xylitol, bioactive food ingredients and plastics. Lignin can be recovered and used as the base for a wide number of industrial chemicals such as dispersants, binders, carbonized films, and phenol replacements. An important step in the successful conversion of lignocellulosics to chemicals is the conditioning, and pretreatment of the biomass to increase reactivity and to separate the toxins and hemicellulose from the biomass.

Several methods have been investigated for pretreatment of lignocellulosic materials to produce reactive cellulose. These methods are classified into physical pretreatments, biological pretreatments and physicochemical pretreatments (21, 22). Physical and biological methods alone are not sufficient. Pretreatments that combine both chemical and physical processes are referred to as physicochemical processes (26). These methods are among the most effective and include the most promising processes for industrial applications. Lignin removal and hemicellulose hydrolysis are often nearly complete. Increase in cellulose surface area, decrease in cellulose degrees of polymerization and crystallinity greatly increase overall cellulose reactivity. Treatment rates are usually rapid. The steam explosion process is well documented. Batch and continuous processes were tested at laboratory and pilot scale by several research groups and companies (37, 38). In steam explosion pretreatment, high pressure and hence high temperatures are used i.e. 160° C. to 260° C. for 1 minute to 20 minutes (21, 17-23). The pressure is suddenly reduced, which explosive decompression leads to an explosive decomposition of the materials, leading to defibrization of the lignocellulosic fibers.

Steam explosion pretreatment has been successfully applied on a wide range of lignocellulosic biomasses with or without chemical addition (11, 20, 42-44). Acetic acid, dilute sulfuric acid, or sulfur dioxide are the most commonly used chemicals. In the autohydrolysis process, no acid is added as the biomass has a hemicellulose that is high in acetyl groups that are released to form acetic acid during the steaming process. The degree of acetylation of hemicelluloses varies among different sources of biomass. The pretreatment is not effective in dissolving lignin, but it does disrupt the lignin structure and increases the cellulose's susceptibility to enzymatic hydrolysis (11, 38, 45).

The use of liquid ammonia instead of dilute acid effectively reduces the lignin fraction of the lignocellulosic materials (46). However, during ammonia fiber explosion pretreatment (AFEX) a part of the phenolic fragments of lignin and other cell wall extractives remain on the cellulosic surface. AFEX pretreatment does not significantly solubilize hemicellulose if compared to dilute-acid pretreatment. Consequently, hemicellulose and cellulose fractions remain intact and cannot be separated in solid and liquid streams (47). Furthermore, ammonia must be recycled after the pretreatment in order to reduce cost and protect the environment (48).

In the Organosolv process, lignocellulose is mixed with a mixture of organic solvents and water and heated to dissolve the lignin and part of the hemicellulose, leaving reactive cellulose in the solid phase (55, 56). A variety of organic solvents such as alcohols, esters, ketones, glycols, organic acids, phenols, and ethers have been used. For economic reasons, the use of low-molecular-weight alcohols such as ethanol and methanol has been favored (20, 57). A drawback of the Organosolv process is the presence of hemicellulose with the lignin. An extensive overview of prior art Organosolv processes is given in "Organosolv pulping"—A review and distillation study related to peroxyacid pulping" (58).

In the process patented by Pazner and Chang (59, 60), lignocellulosic biomass is saccharified to convert pentosans and hexosans to sugars by cooking under pressure at from 180° C. to 220° C. with an acetone-water solvent mixture carrying from 0.05% to 0.25% by weight of acid. Whole woody material is nearly dissolved by the process yielding mixed pentoses and hexoses. Delignified pulp is hydrolyzed to glucose monomers that have to be recovered from the liquor.

The Alcell pulping process and further process developments have been applied with limited success on woody biomass (61-64). The problem with these processes is that they result in combined hemicellulose and lignin streams i.e. black liquor that is hard to separate afterwards. Lignin is precipitated from a black liquor produced by pulping wood at high temperatures and pressures with an aqueous lower aliphatic alcohol solvent i.e. lignin is precipitated by diluting the black liquor with water and an acid to form a solution with a pH of less than 3 and an alcohol content of less than 30%.

Pretreatment of lignocellulosic biomass is projected to be the single, most expensive processing step, representing about 20% of the total cost (65). In addition, the pretreatment type and conditions will have an impact on all other major operations in the overall conversion process from choice of feedstock through to size reduction, hydrolysis, and fermentation as well as on to product recovery, residue processing, and co-product potential. A number of different pretreatments involving biological, chemical, physical, and thermal approaches have been investigated over the years, but only those that employ chemicals currently offer the high yields and low costs vital to economic success. Among the most promising are pretreatments using a combination of dilute acid- or sulfur dioxide-catalyzed steam explosion and low molecular weight alcohols.

All of the processes described have the problem of maximizing the yield of glucose, hemicellulose and lignin from biomass. Our invention overcomes some of these problems by increasing the yield of hemicellulose as soluble compounds and minimizing the loss of hemicellulose by degradation to furfural.

A standard biofuel production process for the production of ethanol from lignocellulosic biomass comprises the steps of conditioning, steam pretreatment, enzymatic hydrolysis of cellulose to glucose, fermentation of glucose to ethanol and distillation of the fermented beer to recover the ethanol. In addition, the process must provide for the recovery and utilization of the hemicellulose fraction. Key parameters for success are minimizing the use of enzymes to convert cellulose to glucose while maximizing the recovery of the hemicellulose fraction.

SUMMARY OF THE INVENTION

The inventors have now discovered that at least one of the disadvantages of prior art biofuel processes can be improved by pretreating the biomass in two stages, rather than a single pretreatment stage as is conventional.

The process of the invention generally includes a first stage pretreatment at lower temperature and pressure than the second stage pretreatment. Particularly, the process in accordance with the invention includes pretreating the biomass in a first stage by heating the biomass to a first stage temperature of 140° C. to 180° C. for a first stage time of 30 minutes to 2 hours at a first stage pressure of 105 to 150 psig; and pretreating the biomass in a second stage by heating the biomass to a second stage temperature of 190° C. to 210° C. for a second stage time of 2 to 10 minutes at a second stage pressure of 167 to 262 psig.

Preferably, the process further includes a step of conditioning by atmospheric steam heating and adjusting the moisture content of the biomass prior to the first stage.

The first stage preferably further includes the addition of water, sulfuric acid, sulfur dioxide, acetic acid and/or other acids and a chemical catalyst. Hemicellulose and inhibitors (inhibitory compounds) to downstream hydrolysis and fermentation are preferably removed between the first stage pretreating and the second stage pretreating.

In one embodiment, the first stage pretreating is carried out at a temperature of 140° C. to 170° C. for a time of 50 minutes to 2 hours.

In another embodiment, the second stage pretreating is carried out at a temperature of 200° C. to 210° C. for 3 minutes to 8 minutes.

The removal of hemicellulose and inhibitors to downstream hydrolysis and fermentation is preferably performed by squeezing the biomass in a modular screw device, a screw press or any equivalent device.

In a further embodiment, the process of the invention includes the subsequent step of squeezing the biomass after the second stage pretreatment to further remove hemicellulose and inhibitors to downstream hydrolysis and fermentation.

In yet another embodiment, the first stage temperature is 150° C., the first stage pressure is 105 psig, and the first stage time is 55 min. Preferably, the second stage temperature is 205° C., the second stage pressure is 235 psig, and the second stage time is 6.7 minutes.

In still another embodiment, the conditioning step includes heating the biomass with steam at atmospheric pressure for 10 to 60 minutes; squeezing and draining the biomass to remove liquid containing toxins (for example fatty acids, and/or resins) detrimental to downstream hydrolysis and fermentation; adding water and user selected catalyst evenly to adjust the biomass to a water content of 65% to 80% prior to the first stage.

The catalyst is preferably sulfuric acid added at a concentration of between 0.5% to 2% of the weight of the biomass.

In yet a further embodiment, the water content is 70% to 75% by weight of the biomass and in the conditioning step the biomass is heated to 90° C. to 100° C. for 15 to 30 minutes. Preferably, volatile gasses are released during the step of heating the biomass with steam. in the conditioning step.

BRIEF DESCRIPTION OF THE DRAWING

FIG. 1 shows an exemplary system to carry out the processes described in this application.

DETAILED DESCRIPTION OF PREFERRED EMBODIMENTS

Biomass is typically received in a semi-dry state having a moisture content of less than 50% and as low as 10%. For example, corncobs usually are obtained after the corn has dried in the field to a moisture content of 15% to 35%.

Upon arrival at the processing plant the lignocellulose biomass, such as wood chips, corn cobs, corn stover, wheat straw, switchgrass, bagasse, *miscanthus* etc. are chopped to a convenient size. The biomass then has a length of about 1 inch.

Water in one embodiment is added to the biomass to improve heat transfer from the steam added in the pretreatment step.

In an typical process step, the feedstock is pre-steamed at atmospheric pressure for a period of 10 to 60 minutes prior to pretreatment. During the pre-steaming the temperature rises and non-condensable gases such as air are driven off.

The moistened, pre-steamed feedstock can then be pressurized by squeezing it in a screw press or similar device to raise the pressure in one embodiment to that of the pretreatment process, $1^{st}$ stage. During the squeezing process, some of the liquid is removed along with extractable compounds such as fatty acids, tall oils and resins that adversely affect downstream processing.

The biomass then goes through the first stage of pretreatment where high pressure steam is typically used to raise the temperature to 140° C. 180° C. and held for the equivalent of 30 to 120 minutes.

After this first stage pretreatment the biomass still under pressure is washed and squeezed to remove the solubilized hemicellulose rich fraction which is inhibitory to some downstream processes. It is then fed into a second phase of pretreatment where high pressure steam is used to raise the temperature to 190-210 Degrees Celcius for 2-8 minutes after which it is depressurized rapidly and moved on to downstream processing typically enzyme hydrolysis.

After the second pretreatment step before depressurization the biomass optionally may undergo a second water washing and squeezing step.

The depressurized purified cellulose stream is prepared for downstream processing such as enzyme hydrolysis and fermentation to ethanol.

The hemicellulose washing stream was found to not require further hydrolysis or less than that of a single stage process and can be concentrated and then fed directly into a downstream process such as fermentation to ethanol more preferably co-fermented with the cellulose hydrolysate.

Overall it is was found that using a 2 step pretreatment process was advantageous over a single step process as it recovered more hemicellulose and required less post processing on the hemicellulose.

For example, as shown in FIG. 1, sized biomass 10 is conveyed into a steaming bin or container 30. Biomass is typically received for processing in a semi-dry state having moisture content of less than 50%, and as low as 10%. For example corncobs usually are obtained after the corn has dried in the field to a moisture content of 15% to 35%. Upon arrival at the processing plant, the biomass, such as corncobs, is chopped to a convenient size. The biomass is typically chopped to a length of about 1 inch. Water can be added to the sized biomass to raise moisture content prior to steam heating step in the conditioning process.

Steam 20 is injected proximate to a bottom of the container at one or more spots to heat the sized biomass 10. Air, steam, and non-condensable gases are vented from a vent 35 proximate to a top of the container 30. As the steam 20 drives heat up the container 30, the sized biomass 10 absorbs moisture and becomes evenly charged with moisture. During the steaming, the temperature rises and non-condensable gases are driven off. In one embodiment, the sized biomass 10 is heated to 80° C. to 100° C. with steam at atmospheric pressure for a period of 10 to 60 minutes. In one embodiment more preferably 90° C. to 99° C.

Steam heated biomass is drawn from the bottom of the container 30 and is fed to any type of compression or squeezing device 40 such as a screw press, modular screw device (MSD), etc. It is contemplated that any device that squeezes or compresses biomass could be used to compress the biomass and drain extracted fluids. In one embodiment, the squeezing device 40 squeezes the steam heated biomass with a 2-1 to 6-1 compression ratio, and most preferably 4-1. The squeezing device 40 has a vent 50 to vent gases if necessary, and a drain 55 to drain inhibitory extracts which are squeezed from the steam heated biomass. During the squeezing process, a portion of the liquid is removed from the steam heated biomass along with compounds that adversely affect downstream processing steps in the manufacture of ethanol such as resins, tall oils and fatty acids. These compounds are also adverse to other processes.

Squeezed biomass 45 is then fed to a mixing device 70. The mixing device 70 mixes the squeezed biomass 45 with the optional addition of water through a water inlet 66 and/or optional addition of catalyst through a catalyst inlet 65. In one embodiment, the catalyst is acid and may range in concentration from between 0 and 5% by volume and the biomass water content ranges from 60% to 80% by weight. In one embodiment, this mixing step can be incorporated right on the discharge of the squeezing device 40. A suitable mixing device 70 in one instance could be as simple as one or more injection or addition points along the outlet of the squeezing device 40. This is operable because the squeezed biomass 45 is similar to a squeezed sponge and it can readily and actively absorb the water and chemicals. In a preferred embodiment of the mixing step, water and/or water and catalyst such as sulfuric acid are added to bring the moisture content to greater than 65%.

The conditioned biomass then discharges into the $1^{st}$ stage pretreatment reactor 80

The biomass is treated in the $1^{st}$ stage pre-treatment reactor 80 at a temperature of 140 to 180° C., at a pressure of 105 to 150 psig for a time of 30 to 120 minutes depending on biomass feedstocks, the pressure is regulated by a valve and is typically held higher than the steam table as the biomass releases gasses during pretreatment. Optionally, water 90 is added to the $1^{st}$ stage pre-treatment reactor 80. Hemicellulose and inhibitory compounds, which compounds can be detrimental to downstream hydrolysis and fermentation 95 can be optionally removed from the $1^{st}$ stage pre-treatment reactor 80, for example as described in United States Patent Application Publication No. 2010/0263814, titled "Pretreatment of Lignocellulosic Biomass Through Removal of Inhibitory Compounds", which is incorporated herein by reference.

After treatment in the $1^{st}$ stage pre-treatment reactor 80, the partially pretreated biomass is fed to a compressing extraction device such as screw press, modular screw device or counter-current washer 100 with the optional addition of water 90, inhibitors such as Hemicellulose and other soluble compounds that are inhibitory to some downstream processing, such as cellulose hydrolysis or ethanol fermentation, can be removed through a drain 110.

The partially treated biomass is then discharged into a tank for subsequent hydrolysis etc, or fed to a $2^{nd}$ stage pretreatment reactor 130. The $2^{nd}$ stage pretreatment reactor 130 is at a temperature of 190 to 210° C., and a pressure of 167 to 262 psig for a time of 2 to 8 minutes by using high pressure steam at 115 In a optional embodiment, depending on the type of equipment utilized and the biomass type pre-treated biomass is then discharged to another compressing extraction device such as modular screw device, screw press or counter-current washer 140, and optionally hemicellulose and other soluble compounds that are inhibitory to one or more of downstream hydrolysis and fermentation are removed through a drain 150.

The pre-treated biomass is then discharged through a pressure reducing device to a cyclone 160. Purified cellulose is removed from the bottom of the cyclone 180, and flash steam vapors can be recovered from the top outlet 170.

The following examples show the increase in the recovery of soluble hemicellulose using the novel two stage pretreatment process as well as the improvement in ethanol yield when both hemicellulose and cellulose are used to make ethanol.

EXAMPLES

Example 1

2-Stage Dilute Acid Pretreatment

Corncobs were chopped, moistened and conditioned using steam to preheat, adjust moisture, and to remove air and other non-condensable gases. Sulfuric acid was added in the amount of 0.8%. The conditioned, acidified cobs were pretreated at a temperature of 150° C. for 55 minutes using high pressure steam. The cobs were then washed with water to remove a hemicellulose rich stream (solid liquid separation) and then subjected to a second pretreatment at a temperature of 205° C. for 6.7 minutes. The cellulose solids were hydrolyzed and then co-fermented with the hemicellulose stream into ethanol.

Example 2

Single Stage Dilute Acid

Corncobs were chopped, moistened and conditioned using steam to preheat, adjust moisture, and to remove air and other non-condensable gases. Sulfuric acid was added in the amount of 0.8%. The conditioned, acidified cobs were pretreated at a temperature of 150° C. for 120 minutes using high pressure steam. The cobs were then washed. The cellulose solids and hemicellulose stream were hydrolyzed and co-fermented into ethanol.

The yield of soluble hemicellulose monomers (XMG) was 79% for the 2-stage dilute acid, example 1, an increase of 11 percentage points over the single stage process, example 2. Both cellulose and hemicellulose streams were fermented to ethanol. The overall yield of ethanol increased from 316 to 321 liters per tonne for the 2-stage process over the single. As seen at chart 1, the 2-stage process in example 1, did not require a hemicellulose hydrolysis step as the single stage. In example 2, a processing benefit can be realized by alternatively adding the hemicellulose hydrolysis step to the 2-stage process which would have further increased the ethanol yield over the single step.

Example 3

2-Stage Autohydrolysis

The yield of soluble hemicellulose monomers (XMG) was 75% in the 2-stage, example 3. This was an increase of 14 percentage points over a single stage process in example 4. The overall yield of ethanol increased from 308 to 317 liters per tonne for the 2-stage process over the single stage. As seen in chart 1, the 2-stage process in example 3 did not require a hemicellulose hydrolysis step as required in the single stage processing, example 4. A processing benefit can be realized by alternatively adding the hemicellulose hydrolysis step to the 2-stage as this would have further increased the ethanol yield over the single step.

Poplar wood chips were moistened, squeezed to remove extractives and further conditioned using steam to preheat, adjust moisture, and to remove air and other non-condensable gases (Chart 2—Line #6-8). The conditioned poplar chips were pretreated at a temperature of either 170° C. for 60 minutes under standard pulp and paper autohydrolysis conditions (Single stage) or 170° C. for 60 minutes (first stage) followed by a second stage carried out at 205° C. for 8 minutes using high pressure steam in presence of dilute acid catalyst to adjust pH value to pH 2.0 (Chart 2—Line #11-15). The prehydrolysed poplar chips were washed after the single or first stage pretreatment. The cellulose solids and hemicellulose stream were analyzed (Chart 2—Line #16-35), hydrolyzed (Chart 2—Line #36-45) and co-fermented into ethanol (Chart 2—Line #46-50).

If compared to the standard pulp and paper single stage autohydrolysis pretreatment, the two stage pretreatment led to a substantial increase in the yields of The yield of soluble hemicellulose monomers (XMG) was 75% in the 2-stage, example 3. This was an increase of 14 percentage points over a single stage process in example 4. The overall yield of ethanol increased from 308 to 317 liters per tonne for the 2-stage process over the single stage. As seen in chart 1, the 2-stage process in example 3 did not require a hemicellulose hydrolysis step as required in the single stage processing example 4. A processing benefit can be realized by alternatively adding the hemicellulose hydrolysis step to the 2-stage as this would have further increased the ethanol yield over the single step.

CHART 1

| | | Single stage pretreatment | | Two-stage pretreatment | |
|---|---|---|---|---|---|
| Incoming Carbohydrates kg per mtdm Glucose 400, Xylose/Mannose/Galactose 300 | | Example 4 Single Stage Autohydrolysis | Example 2 Single Stage Dilute Acid | Example 3 2-stage Autohydrolysis | Example 1 2-stage Dilute Acid |
| Pretreatment Recovery (%) | Total Glucose | 99 | 99 | 98 | 98 |
| | Total Hemicellulose Sugars | 74 | 80 | 82 | 85 |
| | Soluble Hemicellulose Sugars | 61 | 68 | 75 | 79 |
| Ethanol Yield (%, per mtdm) | | 308 | 316 | 317 | 321 |

CHART 3

Detailed Conditions of Examples 1-4

Biomass Conditioning all examples   Particle size reduction (0.3-3 cm), Moisture adjustment 50-80%, 10-50 min pre-steaming at 90° C. to 100° C.

|  |  | Single stage pretreatment | | Two- stage pretreatment | |
|---|---|---|---|---|---|
|  |  | Pretreatment Example | | | |
|  |  | Example 4 Single Stage Autohydrolysis Pretreatment conditions | Example 2 Single Stage Dilute Acid | Example 3 2-Stage Autohydrolysis | Example 1 2-Stage Dilute Acid |
| Stage #1 | Temperature (° C.) | 205 | 150 | 150 |  |
|  | Pressure (psig) | 235 | 54 | 54 |  |
|  | Time (min) | 8 | 120 | 55 |  |
|  | $H_2SO_4$ (%, w/w dm) | 0 | 0.8 | 0 | 0.8 |
|  | pH post pre-treatment | 3.8 | 2.0 | 3.8 | 2.0 |
| Stage #2 | Temperature (° C.) |  |  | 205 |  |
|  | Pressure (psig) |  |  | 235 |  |
|  | Time (min) |  |  | 6.7 |  |
|  | Acid (%, w/w dm) |  |  | 0 |  |
|  | pH post pre-treatment |  |  | 4.4 |  |
| Hemicellulose stream post-hydrolysis (enzymatic or dilute acid) | | Yes | No | Yes | No |

Example 5

Single Stage Autohydrolysis and Two-Stage Pre-Treatment of Poplar

Poplar wood chips were moistened, squeezed to remove extractives and further conditioned using steam to preheat, adjust moisture, and to remove air and other non-condensable gases (Chart 2—Line #6-8). The conditioned poplar chips were pretreated at a temperature of either 170° C. for 60 minutes under standard pulp and paper autohydrolysis conditions (Single stage) or 170° C. for 60 minutes (first stage) followed by a second stage carried out at 205° C. for 8 minutes using high pressure steam in presence of dilute acid catalyst to adjust pH value to pH 2.0 (Chart 2—Line #11-15). The prehydrolysed poplar chips were washed after the single or first stage pre-treatment. The cellulose solids and hemicellulose stream were analyzed (Chart 2—Line #16-35), hydrolyzed (Chart 2—Line #36-45) and co-fermented into ethanol (Chart 2—Line #46-50).

If compared to the standard pulp and paper single stage autohydrolysis pretreatment, the two stage pre-treatment led to a substantial increase in the yields of (i) soluble monomers and oligomers hemicellulose sugars (Chart 2—Line #24-26), (ii) xylose oligomers and monomers (Chart 2—Line #24-26, 45, 49), (iii) glucose monomers (Chart 2—Line #38) that results from an improved digestibility of the cellulose fibers (Chart 2—Line #37), and thus (iv) ethanol (i.e. +15%) on a dry matter basis of incoming poplar chips (Chart 2—Line #51)

The above-described embodiments are intended to be examples only. Alterations, modifications and variations can be effected to the particular embodiments by those of skill in the art without departing from the scope, which is defined solely by the claims appended hereto.

CHART 2

Single Stage Autohydrolysis and two-stage pretreatment of poplar

| Process | | Line # | Parameters | (Units) | Single stage Values | Two stage Values |
|---|---|---|---|---|---|---|
| Feedstock | Wood chips | 1 | Poplar | (kg DM) | 1000 | |
|  | Composition | 2 | Glucose | (Kg/MTDM incoming poplar) | 475 | |
|  |  | 3 | Hemicellulose | (Kg/MTDM incoming poplar) | 216 | |
|  |  | 4 | Xylose | (Kg/MTDM incoming poplar) | 184 | |
|  |  | 5 | Other compounds (e.g. Lignin, extractives) | (Kg/MTDM incoming poplar) | 309 | |
| Conditioning | Steps | 6 | Steaming | Time (min)/Temperature (° C.) | 60/100 | |
|  |  | 7 | Squeezing | (compression ratio) | 3.5:1 | |
|  |  | 8 | Moisture adjustment | (% moisture) | 70 | |
| Pre-treatment | Pre-treatment conditions | 11 | Cooking time | (min) | 60 | 7.50 |
|  |  | 12 | Temperature | (° C.) | 170 | 170/205 |
|  |  | 13 | Pressure | (psi) | 100 | 100/235 |
|  |  | 14 | Acid load | (% DM on poplar) | 0 | 0/0.13 |
|  |  | 15 | pH | (pH value) | 3.6 | 3.6/2.0 |
|  | Cellulose (as glucose) | 16 | Total recovered glucose | (% of incoming) | 99.6 | 99.0 |
|  |  | 17 | Total recovered glucose | (Kg/MTDM incoming poplar) | 473 | 470 |
|  |  | 18 | Soluble glucose | (% of incoming) | 1.4 | 3.2 |
|  |  | 19 | Soluble glucose | (Kg/MTDM incoming poplar) | 6 | 15 |
|  |  | 20 | Insoluble glucose | (% of incoming) | 98.3 | 95.8 |
|  |  | 21 | Insoluble glucose | (Kg/MTDM incoming poplar) | 467 | 455 |

CHART 2-continued

Single Stage Autohydrolysis and two-stage pretreatment of poplar

| Process | | Line # | Parameters | (Units) | Single stage Values | Two stage |
|---|---|---|---|---|---|---|
| | Hemi-cellulose | 22 | Total recovered hemicellulose | (% of incoming) | 93.0 | 87.1 |
| | | 23 | Total recovered hemicellulose | (Kg/MTDM incoming poplar) | 201 | 188 |
| | | 24 | Soluble hemicellulose | (% of incoming) | 59.3 | 70.4 |
| | | 25 | Soluble hemicellulose | (Kg/MTDM incoming poplar) | 128 | 152 |
| | | 26 | Hemicellulose monomers | (Kg/MTDM incoming poplar) | 23 | 28 |
| | | 27 | Insolube hemicellulose | (% of incoming) | 33.7 | 16.7 |
| | | 28 | Insolube hemicellulose | (Kg/MTDM incoming poplar) | 73 | 36 |
| | Xylose | 29 | Total recovered xylose | (% of incoming) | 92.5 | 87.2 |
| | | 30 | Total recovered xylose | (Kg/MTDM incoming poplar) | 170 | 160 |
| | | 31 | Soluble xylose | (% of incoming) | 60.9 | 74.2 |
| | | 32 | Soluble xylose | (Kg/MTDM incoming poplar) | 112 | 137 |
| | | 33 | Xylose monomers | (Kg/MTDM incoming poplar) | 18 | 24 |
| | | 34 | Insolube xylose | (% of incoming) | 31.6 | 13.0 |
| | | 35 | Insolube xylose | (Kg/MTDM incoming poplar) | 58 | 24 |
| Hydrolysis | Cellulose (C6) stream | 36 | Hydrolysis of Cellulose prehydrolysate - 17% consistency, 120 h, 0.57% DM cellulases on poplar | | | |
| | | 37 | Conversion to glucose monomers | (% of insoluble glucose) | 73.6 | 90.5 |
| | | 38 | Soluble glucose monomers | (Kg/MTDM incoming poplar) | 344 | 412 |
| | | 39 | Conversion to xylose monomers | (% of insoluble xylose) | 71.6 | 94.7 |
| | | 40 | Soluble xylose monomers | (Kg/MTDM incoming poplar) | 42 | 23 |
| | Hemi-cellulose (C5) stream | 41 | Post-hydrolysis of Hemicellulose prehydrolysates - 13% consistencyc, 4 h, pH 2 (Sulphuric acid) | | | |
| | | 42 | Conversion to glucose monomers | (% of soluble glucose) | 65 | 53 |
| | | 43 | Soluble glucose monomers | (Kg/MTDM incoming poplar) | 4 | 8 |
| | | 44 | Conversion to xylose monomers | (% of soluble xylose) | 96 | 95 |
| | | 45 | Soluble xylose monomers | (kg/MTDM incoming poplar) | 108 | 130 |
| Fermentation | C5-C6 co-fermentation | 46 | Monomers (C5 & C6) available for Co-fermentation (48 h, 1gpl DM of propagated C5-C6 yeast) | | | |
| | | 47 | Total C5-C6 monomers | (Kg/MTDM incoming poplar) | 497 | 572 |
| | | 48 | Glucose monomers | (Kg/MTDM incoming poplar) | 348 | 420 |
| | | 49 | Xylose monomers | (Kg/MTDM incoming poplar) | 149 | 152 |
| | | 50 | Fermentation yield | (% of Theoretical Maximum) | 91 | 91 |
| Ethanol distillation/dehydrate | | 51 | Ethanol production | (L/MTDM incoming poplar) | 292 | 336 |

REFERENCES (1) Shapouri H et al. (1995) USDA Report 721. Estimating the net energy balance of corn ethanol.
(2) Shapouri H et al. (2002) USDA Report 813. The Energy Balance of corn ethanol: an update. (3) Chow J et al. (2003) Science, 302, 1528-1531 Energy resources and global development.
(4) Wald M L, Barrionuevo A (2007) New York Times, April 7th, The Energy challenge: A Renewed push for ethanol, without the corn.
(5) Greeg D (2008) Biocycle, 49, 11-47. Commercializing cellulosic ethanol.
(6) Hill J et al. (2006) Proc. Natl. Acad. Sci. USA, 103, 11206-11210. Environmental, economic, and energetic costs and benefits of biodiesel and ethanol biofuels.
(7) Farrell A E et al. (2006) Science, 311, 506-508. Ethanol can contribute to energy and environmental goals.
(8) Somerville C (2007) Current biology, 17, 115-119. Biofuels.
(9) Schuetzle D et al. (2007) Western Governors' Association. Alcohol fuels from biomass—Assessment of production technologies.
(10) Chum L, Overend R (2002) Fuel Processing technology, 71, 187-195. Biomass and renewable fuels.
(11) Wyman C E (1996) Taylor & Francis: Washington D.C., USA, Handbook on bioethanol: production and utilization.
(12) Delmer D P, Amor Y (1995) Plant Cell, 7, 987-1000. Cellulose biosynthesis.
(13) Morohoshi N (1991) In Wood and cellulosic chemistry; Hon, D. N. S, Shiraishi, N., Eds.; Marcel Dekker, Inc.: New York, USA, Chemical characterization of wood and its components.
(14) Ha M A et al. (1998) Plant J. 1998, 16, 183-190. Fine structure in cellulose microfibrils: NMR evidence from onion and quince.
(15) Palmqvist E, Hahn-Hägerdal B (2000) Bioresource Technol., 74, 25-33. Fermentation of lignocellulosic hydrolysates. II: Inhibitors and mechanisms of inhibition.
(16) De Vrije T et al (2002) International journal of hydrogen energy, 27, 1381-1390. Pretreatment of *miscanthus* for hydrogen production by *thermotoga elfii*.
(17) Galbe M, Zacchi G (2002) Appl Microbiol Biotechnol 59 618-628. A review of the production of ethanol from softwood.
(18) Torget R et al. (1991) Bioresource Technol., 35, 239-246. Dilute sulfuric acid pretreatment of hardwood bark.
(19) Donghai S et al. (2006) Chinese J. Chem. Eng., 14, 796-801. Effects of different pretreatment modes on the enzymatic digestibility of corn leaf and corn stalk.
(20) Sun Y, Cheng J (2002) Bioresources Technol., 83, 1-11. Hydrolysis of lignocellulosic materials for ethanol production: A review.
(21) McMillan J D (1994) In *Enzymatic Conversion of Biomass for Fuels Production*; Himmel, M. E., Baker, J. O., Overend, R. P., Eds.; ACS: Washington D.C., USA, 1994; pp. 292-324. Pretreatment of lignocellulosic biomass.
(22) Fan L et al (1982) *Adv. Biochem. Eng. Biotechnol.*, 23, 158-183. The nature of lignocellulosics and their pretreatments for enzymatic hydrolysis.
(23) Mosier N et al. (2005) Bioresources Technol, 96, 673-686. Features of promising technologies for pretreatment of lignocellulosic biomass.
(24) Henley R G et al. (1980) Enzyme Microb. Tech., 2, 206-208. Enzymatic saccharification of cellulose in membrane reactors.

(25) Berlin A et al. (2006) J. Biotechnol., 125, 198-209. Inhibition of cellulase, xylanase and beta-glucosidase activities by softwood lignin preparations.
(26) Chandra R et al. (2007) Adv. Biochem. Eng. Biotechnol, 108, 67-93. Substrate pretreatment: The key to effective enzymatic hydrolysis of lignocellulosics?
(27) Kassim E A, El-Shahed A S (1986) Agr. Wastes, 17, 229-233. Enzymatic and chemical hydrolysis of certain cellulosic materials.
(28) Xu Z et al (2007) Biomass Bioenerg. 2007, 31, 162-167. Enzymatic hydrolysis of pretreated soybean straw.
(29) Vaccarino C et al (1987) Biol. Waste, 20, 79-88. Effect of SO2NaOH and Na2CO3 pretreatments on the degradability and cellulase digestibility of grape marc.
(30) Silverstein R A et al (2007) Bioresource Technol,. 2007, 98, 3000-3011. A comparison of chemical pretreatment methods for improving saccharification of cotton stalks.
(31) Zhao X et al (2007) Bioresource Technol., 99, 3729-3736. Comparative study on chemical pretreatment methods for improving enzymatic digestibility of crofton weed stem.
(32) Gaspar M et al (2007) Process Biochem., 2007, 42, 1135-1139. Corn fiber as a raw material for hemicellulose and ethanol production.
(33) Saha B C, Cotta M A (2006) Biotechnol. Progr., 22, 449-453. Ethanol production from alkaline peroxide pretreated enzymatically saccharified wheat straw.
(34) Saha B C, Cotta M A (2007) Enzyme Microb. Tech., 41, 528-532. Enzymatic saccharification and fermentation of alkaline peroxide pretreated rice hulls to ethanol.
(35) Mishima D et al (2006) Bioresource Technol. 2006, 97, 2166-2172. Comparative study on chemical pretreatments to accelerate enzymatic hydrolysis of aquatic macrophyte biomass used in water purification processes.
(36) Sun X F et al (2005) Carbohyd. Res., 340, 97-106. Characteristics of degraded cellulose obtained from steam-exploded wheat straw.
(37) Chum H L (1985) Solar Energy Research Institute: Golden, Colo., 1-64. Evaluation of pretreatments of biomass for enzymatic hydrolysis of cellulose.
(38) Taherzadeh M J, Karimi K (2007) Bioressources, 2, 472-499. Process for ethanol from lignocellulosic materials I: Acid-based hydrolysis processes.
(39) Ruiz E et al (2008) Enzyme Microb. Tech., 42, 160-166. Evaluation of steam explosion pretreatment for enzymatic hydrolysis of sunflower stalks.
(40) Ballesteros M et al. (2004) Process Biochem., 39, 1843-1848. Ethanol from lignocellulosic materials by a simultaneous saccharification and fermentation process (SFS) with *Kluyveromyces marxianus* CECT 10875.
(41) Negro M J et al (2003) Appl. Biochem. Biotechnol., 105, 87-100. Hydrothermal pretreatment conditions to enhance ethanol production from poplar biomass.
(42) Kurabi A et al (2005) Appl. Biochem. Biotechnol., 121-124. Enzymatic hydrolysis of steam exploded and ethanol organosolv-pretreated Douglas-fir by novel and commercial fungal cellulases.
(43) Varga E et al (2004) Appl. Biochem. Biotechnol., 509-523. Optimization of steam pretreatment of corn stover to enhance enzymatic digestibility.
(44) Eklund R (1995) Bioresource Technol., 52, 225-229. The influence of SO2 and H2SO4 impregnation of willow prior to steam pretreatment.
(45) Yang B, Wyman C E (2004) Biotechnol. Bioeng, 86, 88-95. Effect of xylan and lignin removal by batch and flowthrough pretreatment on the enzymatic digestibility of corn stover cellulose.
(46) Alizadeh H et al (2005) Appl. Biochem. Biotechnol., 124, 1133-41. Pretreatment of switchgrass by ammonia fiber explosion (AFEX).
(47) Chundawat S P et al (2007) Biotechnol. Bioeng., 96, 219-231. Effect of particle size based separation of milled corn stover on AFEX pretreatment and enzymatic digestibility.
(48) Eggeman T, Elander R T. (2005) Bioresource Technol., 96, 2019-2025. Process and economic analysis of pretreatment technologies.
(49) Taherzadeh M J, Karimi K (2007) BioResources, 2, 707-738. Enzymatic-based hydrolysis processes for ethanol from lignocellulosic materials: A review.
(50) Neely W C (1984) Biotechnol. Bioeng., 26, 59-65. Factors affecting the pretreatment of biomass with gaseous ozone.
(51) Vidal P F, Molinier J (1988) *Biomass,* 16, 1-17. Ozonolysis of Lignin—Improvement of in vitro digestibility of poplar sawdust.
(52) Azzam A M (1989) J. Environ. Sci. Heal., 24, 421-433. Pretreatment of cane bagasse with alkaline hydrogen peroxide for enzymatic hydrolysis of cellulose and ethanol fermentation.
(53) Katzen R et al (1995) In *The Alcohols Textbook*; Lyons, T. P., Murtagh, J. E., Kelsall, D. R., Eds.; Nothingham University Press, 37-46. Use of cellulosic feedstocks for alcohol production.
(54) Araque E et al (2007) Enzyme Microb. Tech., 43, 214-219. Evaluation of organosolv pretreatment for the conversion of *Pinus radiata* D. Don to ethanol.
(55) Itoh H et al (2003) J. Biotechnol., 103, 273-280. Bioorganosolve pretreatments for simultaneous saccharification and fermentation of beech wood by ethanolysis and white rot fungi.
(56) Pan X et al (2006) Biotechnol. Bioeng., 94, 851-861. Bioconversion of hybrid poplar to ethanol and co-products using an organosolv fractionation process: optimization of process yields.
(57) Arato C et al (2005) Appl. Biochem. Biotechnol. 2005, 123, 871-882. The lignol approach to biorefining of woody biomass to produce ethanol and chemicals.
(58) Muurinen E (2000) University of Oulu, Finland, ISBN 951-42-5661-1. Organosolv pulping—A review and distillation study related to peroxyacid pulping. http://herkules.oulu.fi/isbn9514256611/isbn9514256611.pdf
(59) Pasner L, Chang P C (1983) U.S. Pat. No. 4,409,032
(60) Pasner L, Chang P C (1984) U.S. Pat. No. 4,470,851
(61) Lora J H et al (1988) U.S. Pat. No. 4,764,596, International publication WO 93/15261
(62) Van Heiningen A R P (1996) U.S. patent Ser. No. 08/621,5096, International publication WO 97/36040
(63) Pye E K (2002) US patent #2002/0069987
(64) Petrus L (2007) US patent #2007/0034345 A1
(65) Yang B, Wyman C E (2007) Biofuels, Bioproducts and Biorefining, 2, 26-40. Pretreatment: the key to unlocking low-cost cellulosic ethanol.

What is claimed is:

1. A process for the production of ethanol from lignocellulosic biomass, comprising:
    a) conditioning the lignocellulosic biomass by pre-steaming the lignocellulosic biomass, compressing the pre-steamed lignocellulosic biomass for removing aqueous extractives and adjusting a water content of the lignocellulosic biomass after the removing step to 65% to 80% for generating a conditioned biomass;
    b) subjecting the conditioned biomass to high pressure steam pretreatment to obtain pretreated biomass;

c) rapidly depressurizing the pretreated biomass;
d) separating purified cellulose from the depressurized pretreated biomass; and
e) producing ethanol from said cellulose;
the high pressure steam pretreatment being a two stage steam pretreatment comprising of the steps of
  i) in a first stage of the steam pretreatment, heating the conditioned biomass with high pressure steam at a first stage pressure of 105 to 150 psig to a first stage temperature of 140° C. to 180° C. for a first stage time of 30 minutes to 2 hours to generate a partially pretreated biomass;
  ii) after the first stage and while the partially pretreated biomass is still under pressure, removing hemicellulose and inhibitors to downstream hydrolysis and fermentation by squeezing the partially pretreated biomass in a modular screw device, a screw press or equivalent device for removing solubilized hemicellulose and inhibitors to downstream hydrolysis and fermentation, and feeding the squeezed biomass to a second stage;
  iii) in the second stage of the steam pretreatment, heating the squeezed biomass with high pressure steam at a second stage pressure higher than the first stage pressure and at 167 to 262 psig for raising the temperature to a second stage temperature higher than the first stage temperature and at 190° C. to 210° C., for a second stage time of 2 to 10 minutes.

2. The process of claim 1, wherein the conditioning is carried out by atmospheric steam heating.

3. The process of claim 1, wherein the first stage further comprises the addition of water and at least one of an acid promoting hemicellulose hydrolysis, sulfuric acid, sulfur dioxide, acetic acid, or a chemical catalyst promoting hemicellulose hydrolysis.

4. The process of claim 1, wherein the first stage is carried out at a temperature of 140° C. to 170° C. for a time of 50 minutes to 2 hours.

5. The process of claim 1, wherein the second stage is carried out at a temperature of 200° C. to 210° C. for 3 to 8 minutes.

6. The process of claim 1, wherein the first stage temperature is 150° C., the first stage pressure is 105 psig, and the first stage time is 55 minutes.

7. The process of claim 1, wherein the second stage temperature is 205° C., the second stage pressure is 235 psig, and the second stage time is 6.7 minutes.

8. The process of claim 2, wherein the conditioning step comprises: heating the lignocellulosic biomass with steam at atmospheric pressure for 10 to 60 minutes; squeezing and draining the steamed biomass to remove the aqueous extractives; and evenly adding water and a catalyst promoting hemicellulose hydrolysis to adjust the biomass to the water content of 65% to 80%.

9. The process of claim 8, wherein the aqueous extractives comprise fatty acids, and/or resins.

10. The process of claim 8, wherein the catalyst is sulfuric acid which is added at a concentration of from 0.15% to 2% of the weight of the biomass.

11. The process of claim 8, wherein the water content is 70% to 75% by weight of the biomass.

12. The process of claim 8, wherein in the conditioning step the lignocellulosic biomass is heated to 90° C. to 100° C. for 15 to 30 minutes.

13. The process of claim 8, wherein during the conditioning step, volatile gasses are released during the step of heating the biomass with steam.

14. A process for the production of ethanol from a lignocellulosic biomass, comprising:
  a) conditioning the lignocellulosic biomass by
    i) pre-steaming the lignocellulosic biomass,
    ii) compressing the pre-steamed lignocellulosic biomass for removing aqueous extractives, and
    iii) adjusting a water content of the lignocellulosic biomass after the removing step for generating a conditioned biomass;
  b) subjecting the conditioned biomass to a first stage steam pretreatment by
    i) heating the conditioned biomass with high pressure steam at a first stage pressure of 105 to 150 psig to a first stage temperature of 140° C. to 180° C. for a first stage time of 30 minutes to 2 hours, and
    ii) after step i) and while maintaining the first stage pressure, removing hemicellulose and inhibitors to downstream hydrolysis and fermentation by squeezing, to generate a partially pretreated biomass;
  c) subjecting the partially pretreated biomass to a second stage pretreatment by
    i) increasing the temperature of the partially treated biomass by heating the partially pretreated biomass with high pressure steam to a second stage temperature higher than the first stage temperature and at 190° C. to 210° C. for a second stage time of 2 to 10 minutes, and increasing the pressure to a second stage pressure higher than the first stage pressure and at 167 to 262 psig; and
    ii) removing hemicellulose and hemicellulose decomposition products by squeezing while maintaining the second stage pressure to generate a fully pretreated biomass;
  e) following the second stage pretreatment rapidly decompressing the fully pretreated biomass for obtaining purified cellulose; and
  f) producing ethanol from said cellulose.

* * * * *